United States Patent [19]

Stevens

[11] Patent Number: 5,333,172
[45] Date of Patent: * Jul. 26, 1994

[54] EMERGENCY TELEPHONE COMMUNICATIONS DEVICE

[76] Inventor: Michael B. Stevens, 225 S. Rowlett St., Collierville, Tenn. 38017

[*] Notice: The portion of the term of this patent subsequent to Oct. 26, 2009 has been disclaimed.

[21] Appl. No.: 504,914

[22] Filed: Apr. 5, 1990

[51] Int. Cl.$^5$ .............................................. H04M 1/00
[52] U.S. Cl. .......................................... 379/38; 379/51; 379/45; 379/387; 379/355
[58] Field of Search ................ 379/355, 387, 388, 389, 379/37, 38, 51, 40, 45

[56] References Cited

U.S. PATENT DOCUMENTS

| | | | |
|---|---|---|---|
| 3,156,909 | 11/1964 | Werk | 379/37 X |
| 3,505,476 | 4/1970 | Kelly, Jr. et al. | 379/37 X |
| 3,567,864 | 3/1971 | Palmer et al. | 379/37 X |
| 4,371,751 | 2/1983 | Hilligass, Jr. et al. | 379/38 X |
| 4,513,177 | 4/1985 | Nishino et al. | 379/389 |
| 4,608,462 | 8/1986 | Blomley et al. | 379/389 X |
| 4,866,764 | 12/1989 | Barker, III | 379/355 |
| 5,086,463 | 2/1992 | Vesely et al. | 379/388 |

FOREIGN PATENT DOCUMENTS

| | | | |
|---|---|---|---|
| 2513785 | 4/1983 | France | 379/38 |
| 2183123 | 5/1987 | United Kingdom | 379/38 |

Primary Examiner—James L. Dwyer
Assistant Examiner—Magdy Shehata
Attorney, Agent, or Firm—Bell, Seltzer, Park & Gibson

[57] ABSTRACT

An apparatus for emergency dialing and oneway communication by telephone includes an autodialing circuit for dialing a preselected emergency telephone number. The circuit is activated by a switch and provides communication of audio information from the vicinity of the device to an emergency services operator during an emergency situation such as a criminal assault of a convenience store. The apparatus is characterized by the presence of a microphone, and the absence of a speaker connection for transmitting the voice of the emergency services operator. In this manner, the criminal assailant is not made aware that police have been contacted.

3 Claims, 1 Drawing Sheet

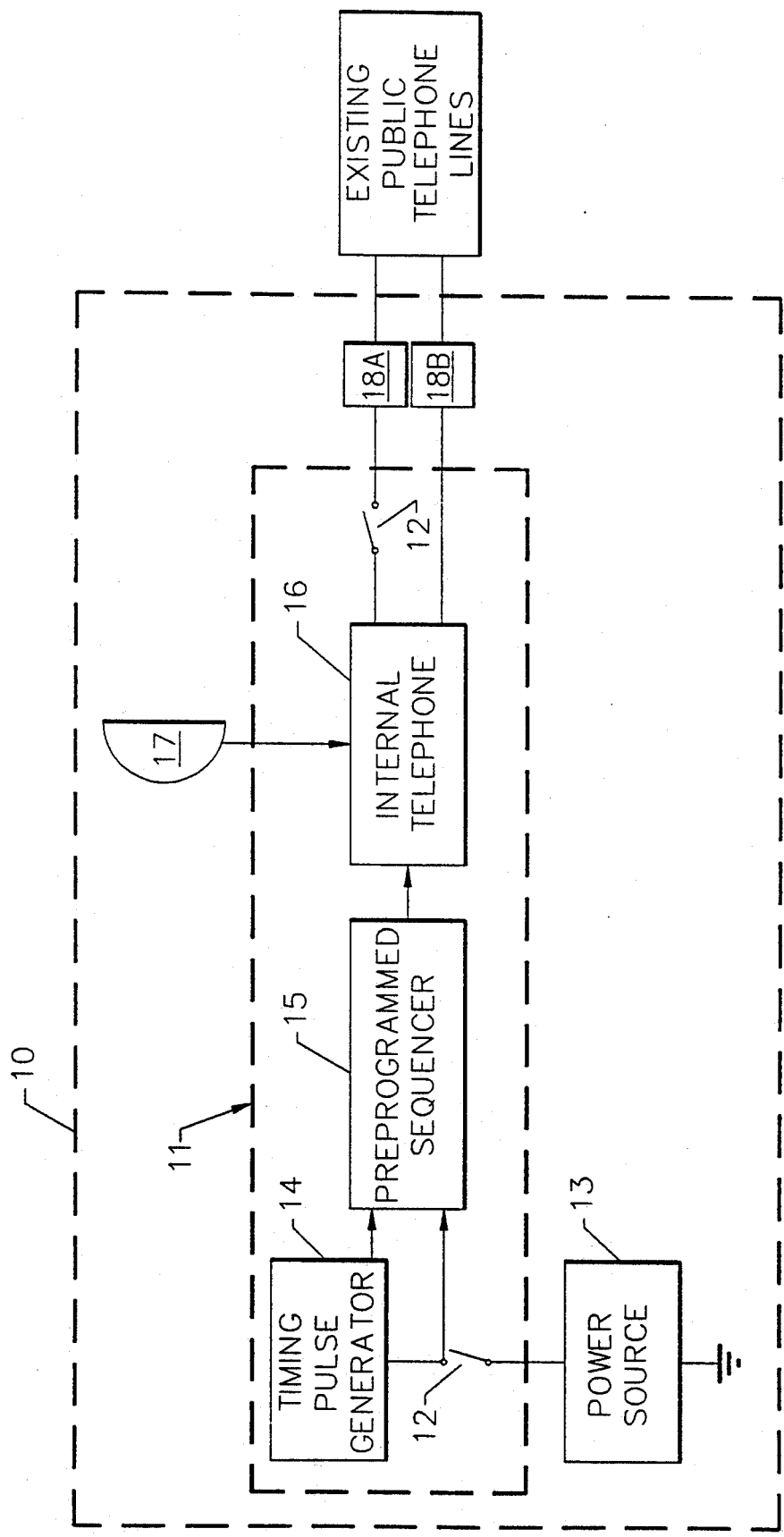

EMERGENCY TELEPHONE COMMUNICATIONS DEVICE

FIELD OF THE INVENTION

This invention relates to an emergency telephone calling device, and more particularly to an apparatus for providing one-way audio communication to an emergency services operator such as police or rescue, during an emergency situation.

BACKGROUND OF THE INVENTION

The number of criminal assaults on operators of gas stations and convenience and liquor stores, for example, has risen steadily during recent decades and the safety of store operators operating at night or in high crime areas is at high risk. Moreover, although a large percentage of store operators have employed numerous safety precautions such as video monitors and have become trained in the use of defensive assault weapons such as handguns, etc., there is still a need to provide immediate communication with emergency services personnel in a manner that will not pose further risk to the store operator or his or her employees or customers. In this regard, it is known to the art that "panic buttons" can be provided that will facilitate help from the police or other emergency personnel by providing the location of the store under criminal assault. Moreover, these devices can be mounted in concealed locations so that store operators can safely activate them without discovery by criminal assailants. However, these known devices are not able to communicate the nature and urgency of the assault and provide a means for gathering evidence of the assault if the assailant is not immediately taken into custody.

SUMMARY OF THE INVENTION

It is therefore an object of the present invention to provide an improved apparatus for contacting emergency services personnel, and which overcomes the above noted limitations of the existing devices of this type.

It is another and more particular object of the present invention to provide an apparatus for oneway audio communication with an emergency services operator that will not be detectable by a criminal assailant.

It is still another object of the present invention to provide an apparatus capable of operating with conventional telephone line connections.

These and other objects are provided according to the present invention by an emergency telephone communications device having an electronic autodialing circuit for dialing the universal emergency number 9-1-1, for example. The dialing circuit is activated by a single switch and at the completion of the dialing a microphone is opened so as to allow the emergency services operator to hear any and all conversations or sounds in the vicinity of the microphone.

Accordingly, the present invention includes a telephone dialer circuit for dialing a preselected emergency number and establishing a telephone line connection and a manually operable switch means for activating the dialer circuit and causing the dialing of the preselected emergency telephone number on a telephone line. The present invention also includes a microphone for sensing and transmitting sound from the vicinity of the microphone upon the telephone line connection being established. The telephone dialer circuit is characterized by the absence of a connection to a speaker so as to preclude audio communication from the emergency services operator.

BRIEF DESCRIPTION OF THE DRAWINGS

FIG. 1 illustrates an electrical schematic block diagram for the emergency telephone communications device and which embodies the present invention.

DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art.

Referring more particularly to FIG. 1, an electrical block diagram of the emergency call device 10 having a telephone dialer circuit 11 is shown. The device 10 typically is mounted in a housing which is adapted to be mounted in a concealed location accessible to a user, such as a convenience store clerk. The device includes a switch 12 for establishing a connection to a telephone line and connecting the power supply 13 to the timing pulse generator 14 and the preprogrammed sequencer 15. The preprogrammed sequencer contains a preselected emergency telephone number such as 9-1-1 and performs the automatic dialing. The emergency number is communicated to the internal telephone 16 which establishes the connection to an emergency services operator. Communication with the emergency services operator is facilitated by the microphone 17 connected to the internal telephone 16. The absence of a speaker connection for communicating the voice of the emergency services operator prevents a criminal assailant from becoming aware that police or other emergency personnel have been contacted. Connections 18A and 18B are adapted to receive the incoming and outgoing portions of the telephone line. As will be understood by one skilled in the art, a conventional telephone jack may be provided for receiving the telephone line and establishing connections 18A and 18B.

In the drawings and specification, there has been set forth a preferred embodiment of the invention, and although specific terms are employed, they are used in a generic and descriptive sense only and not for purposes of limitation.

That which is claimed:

1. An apparatus for emergency dialing and one-way communication by telephone comprising:
   a telephone dialer circuit for dialing a preselected emergency number and establishing a telephone line connection;
   a microphone connected to said telephone dialer circuit for sensing and transmitting sound from the vicinity of the microphone upon the telephone line connection being established;
   manually operable switch means electrically connected to said telephone dialer circuit for activating said circuit and causing the dialing of the preselected emergency telephone number on a telephone line to contact an emergency services operator; and said apparatus being characterized by the absence of a connection to a speaker during all periods when a telephone line connection is established so as to preclude audio communication from the emergency services operator.

2. An apparatus for emergency dialing and one-way communication by telephone comprising:

a housing adapted to be mounted in a concealed location accessible to a user;

an emergency switch mounted to said housing;

a telephone line connection jack mounted to said housing;

a telephone dialer circuit mounted n said housing and connected to said emergency switch and said telephone line connection jack for dialing a preselected emergency telephone number and establishing a telephone line connection to an emergency services operator responsive to activation of said emergency switch; and a microphone connected to said telephone dialer circuit for sensing and transmitting sound upon establishment of a telephone line connection, said apparatus being characterized by the absence of a speaker connection during all periods when a telephone line connection is established so as to preclude audio communication from the emergency services operator.

3. An apparatus for emergency dialing and one-way communication by telephone comprising:

a housing adapted to be mounted in a concealed location accessible to a user;

a power source;

an emergency switch mounted to said housing for, upon actuation, connecting said telephone dialer circuit to said power source and to said telephone line connection jack;

said telephone dialer circuit having an internal telephone for establishing a telephone line connection to an emergency services operator, a preprogrammed sequencer for communicating an emergency telephone number to the internal telephone, and a timing pulse generator for providing timing to the sequencer; and a microphone connected to said telephone dialer circuit for sensing and transmitting sound upon establishment of a telephone line connection, said apparatus being characterized by the absence of a speaker connection during all periods when a telephone line connection is established so as to preclude audio communication from the emergency services operator.

* * * * *

UNITED STATES PATENT AND TRADEMARK OFFICE
CERTIFICATE OF CORRECTION

PATENT NO. : 5,333,172
DATED : July 26, 1994
INVENTOR(S) : Michael B. Stevens

It is certified that error appears in the above-identified patent and that said Letters Patent is hereby corrected as shown below:

Column 3,

Claim 2, line 14, "n" should be -- in --.

Claim 3, after line 7, the following paragraph was omitted and should be inserted -- a telephone line connection jack mounted to said housing; --

Signed and Sealed this

Eighteenth Day of April, 1995

*Attest:*

BRUCE LEHMAN

*Commissioner of Patents and Trademarks*

*Attesting Officer*